United States Patent
Feng et al.

(10) Patent No.: US 10,208,736 B2
(45) Date of Patent: Feb. 19, 2019

(54) HIGH-PRESSURE FLUID MIXING PUMP CONTROL SYSTEM AND FLUID SUCTION CONTROL METHOD

(71) Applicants: China National Offshore Oil Corporation, Beijing (CN); China Oilfield Services Limited, Sanhe (CN)

(72) Inventors: Yongren Feng, Beijing (CN); Minggao Zhou, Beijing (CN); Guiqing Hao, Beijing (CN); Zhijie Yu, Beijing (CN); Zhongtian Hao, Beijing (CN)

(73) Assignees: China National Offshore Oil Corporation, Beijing (CN); China Oilfield Services Limited, Sanhe, Langfang, Hebei (CN)

( * ) Notice: Subject to any disclaimer, the term of this patent is extended or adjusted under 35 U.S.C. 154(b) by 422 days.

(21) Appl. No.: 14/770,827

(22) PCT Filed: Dec. 25, 2013

(86) PCT No.: PCT/CN2013/090478
§ 371 (c)(1),
(2) Date: Aug. 27, 2015

(87) PCT Pub. No.: WO2014/201835
PCT Pub. Date: Dec. 24, 2014

(65) Prior Publication Data
US 2016/0097377 A1 Apr. 7, 2016

(30) Foreign Application Priority Data
Jun. 18, 2013 (CN) .......................... 2013 1 0241440

(51) Int. Cl.
*F16H 25/20* (2006.01)
*G01D 5/04* (2006.01)
(Continued)

(52) U.S. Cl.
CPC ................ *F04B 9/02* (2013.01); *F04B 9/105* (2013.01); *F04B 49/02* (2013.01); *F04B 49/06* (2013.01);
(Continued)

(58) Field of Classification Search
CPC .. F04B 9/02; F04B 9/105; F04B 49/02; F04B 49/20; F04B 49/06; F04B 53/144; F04B 2201/0201; G01D 5/04; F16H 25/2015
See application file for complete search history.

(56) References Cited

U.S. PATENT DOCUMENTS 4,591,320 A 5/1986 Pope
5,343,769 A * 9/1994 Suovaniemi .......... B01L 3/0227
422/926

(Continued)

FOREIGN PATENT DOCUMENTS

CN 200981294 A 11/2007
CN 101745163 A 6/2010
(Continued)

*Primary Examiner* — Nathan C Zollinger
(74) *Attorney, Agent, or Firm* — Ling Wu; Stephen Yang; Ling and Yang Intellectual Property

(57) ABSTRACT

A high-pressure fluid mixing pump control system and a fluid suction control method, the system comprises a transmission threaded rod and a resolver sensor, wherein: one end of the transmission threaded rod is connected to an oil cylinder piston of a mixing pump, while the other end of the transmission threaded rod is connected to the resolver sensor either directly or via a rotary element that rotates coaxially with the transmission threaded rod. The high-pressure fluid mixing pump control system implements precision control via a mechanical means, converts a linear motion of the piston into a rotary motion, and utilizes the resolver sensor for precision measurement of a rotation angle, thus acquiring a piston displacement amount, and finally acquiring a suction volume. At the same time, an accelerator and an (Continued)

electric brake are also designed, for controlling starting and stopping of the mixing pump.

6 Claims, 2 Drawing Sheets

(51) Int. Cl.
    *F04B 9/02*     (2006.01)
    *F04B 49/06*     (2006.01)
    *F04B 49/20*     (2006.01)
    *F04B 9/105*     (2006.01)
    *F04B 49/02*     (2006.01)
    *F04B 53/14*     (2006.01)

(52) U.S. Cl.
    CPC ............ *F04B 49/20* (2013.01); *F04B 53/144* (2013.01); *F16H 25/2015* (2013.01); *G01D 5/04* (2013.01); *F04B 2201/0201* (2013.01)

(56) References Cited

U.S. PATENT DOCUMENTS

| | | | | |
|---|---|---|---|---|
| 5,639,218 A | * | 6/1997 | Tanino | F04B 9/1172 417/3 |
| 7,337,920 B2 | * | 3/2008 | Duck | B67D 1/0878 222/129.4 |
| 2005/0063050 A1 | | 3/2005 | Zamfes | |

FOREIGN PATENT DOCUMENTS

| | | | |
|---|---|---|---|
| CN | 201650642 U | | 11/2010 |
| CN | 102121491 A | * | 7/2011 |
| CN | 102162359 A | | 8/2011 |
| CN | 201924922 A | | 8/2011 |
| CN | 102755858 A | | 10/2012 |
| CN | 102809562 A | | 12/2012 |
| CN | 103277292 A | | 9/2013 |
| CN | 103437989 A | | 12/2013 |
| JP | 2013-28273 | | 2/2013 |

* cited by examiner

HIGH-PRESSURE FLUID MIXING PUMP CONTROL SYSTEM AND FLUID SUCTION CONTROL METHOD

TECHNICAL FIELD

The invention relates to the technical field of formation pressure measurement, particularly to a high-pressure fluid mixing pump control system and a fluid suction control method.

BACKGROUND ART

When measuring formation pressure, it is demanded that the precise value of formation fluid being obtained within the shortest time period. In order to realize this objective, it is of great importance to precisely control fluid suction volume.

At present, control of the suction amount of the high-pressure fluid mixing pump is mostly realized via a displacement sensor. FIG. 1 is a diagram showing an existing high-pressure fluid mixing pump control system. To obtain precise control of the suction amount, a displacement sensor needs to be installed in the pump suction oil cylinder, and meanwhile a complicated set of control system needs to be designed. Referring to FIG. 1, the control system comprises four mechanical hydraulic valves, various hydraulic components and sensors; the piston cylinder is controlled via various complex compound commands, and meanwhile the displacement sensor is used for metering the displacement distance of the piston, thus achieving the purpose of controlling the suction amount.

Aforesaid existing high-pressure fluid mixing pump control system possesses the following drawbacks: 1) the structure is so complicated that it only can be achieved via various compound commands, thus operation is complex; 2) low precision, a large number of commands need to be given during implementation, and operation staff controls them according to the feedback information from the sensors. Because of the delay of data transmission, the precision is often low, the error is around 10% through the actual measurement; 3) reliability can be affected. Since the hydraulic system is easy to be affected by the external environment, outside interferences, for example, the hydraulic oil is not clean enough, will affect the stable operation of the system, and will even lead to paralysis of the whole control system.

Therefore, there are at least the following technical defects in the prior art: a complicated set of hydraulic control loop has to be designed to coordinate with the use of the displacement sensor, so that the whole hydraulic system is very complicated; at the same time, because of the delay of data transmission, the control precision of fluid volume is also affected and is hard to meet the requirement of high precision. Therefore, the existing high-pressure fluid mixing pump has the problem of low control precision or complex structure, which cannot satisfy well the use demand.

CONTENT OF THE INVENTION

To solve the problems present in the prior art, the present invention provides a high-pressure fluid mixing pump control system. Said system comprises a transmission threaded rod and a resolver sensor, wherein:

one end of said transmission threaded rod is connected to an oil cylinder piston of a mixing pump, while the other end of said transmission threaded rod is connected to said resolver sensor either directly or via a rotary element that rotates coaxially with said transmission threaded rod.

Said rotary element that rotates coaxially with said transmission threaded rod can comprise an accelerator, and the other end of said transmission threaded rod can be connected to a connecting shaft via a bearing and a rotary nut and to said accelerator via said connecting shaft.

Said system can also comprise an electric brake, and said electric brake can be connected to said accelerator.

The present invention also provides a fluid suction control method on the basis of aforesaid high-pressure fluid mixing pump control system. Said method comprises:

said resolver sensor metering the number of revolutions of said transmission threaded rod or said rotary element;

obtaining a linear displacement amount of said piston on the basis of said number of revolutions;

obtaining a suction amount of said mixing pump on the basis of the linear displacement amount of said piston.

Said method can also comprise: controlling the rotate speed of said transmission threaded rod via said accelerator.

Said method can also comprise: controlling starting and stopping of said mixing pump via said electric brake.

The embodiment of the invention implements precision control via a mechanical means, converts the linear motion of the piston into a rotary motion, and utilizes the resolver sensor for precision measurement of a rotation angle, thus acquiring a piston displacement amount, and finally acquiring a suction volume; at the same time, an accelerator and an electric brake are also designed, for controlling starting and stopping of the mixing pump. Compared with the prior art, the embodiment of the invention has the advantages of a simplified structure, compactness, and great stability and reliability.

Other features and advantages of the invention will be expounded in the following description, and partly become more apparent from the description, or be understood by implementing the invention. The purpose and other advantages of the invention can be achieved and obtained by means of the structure specifically indicated in the description, claims and drawings.

BRIEF DESCRIPTION OF DRAWINGS

Drawings are used for providing further understanding of the technical schemes of the present invention and constitute a part of the description, used for explaining the technical schemes of the invention in combination with the embodiments of the invention, not for limit the technical schemes of the invention.

PREFERRED EMBODIMENTS OF THE INVENTION

Below the embodiments of the invention will be described in further detail with reference to the drawings. What should be noticed is that the embodiments of the invention and various features of the embodiments can be combined with one another under the premise of no confliction.

Figure 1:
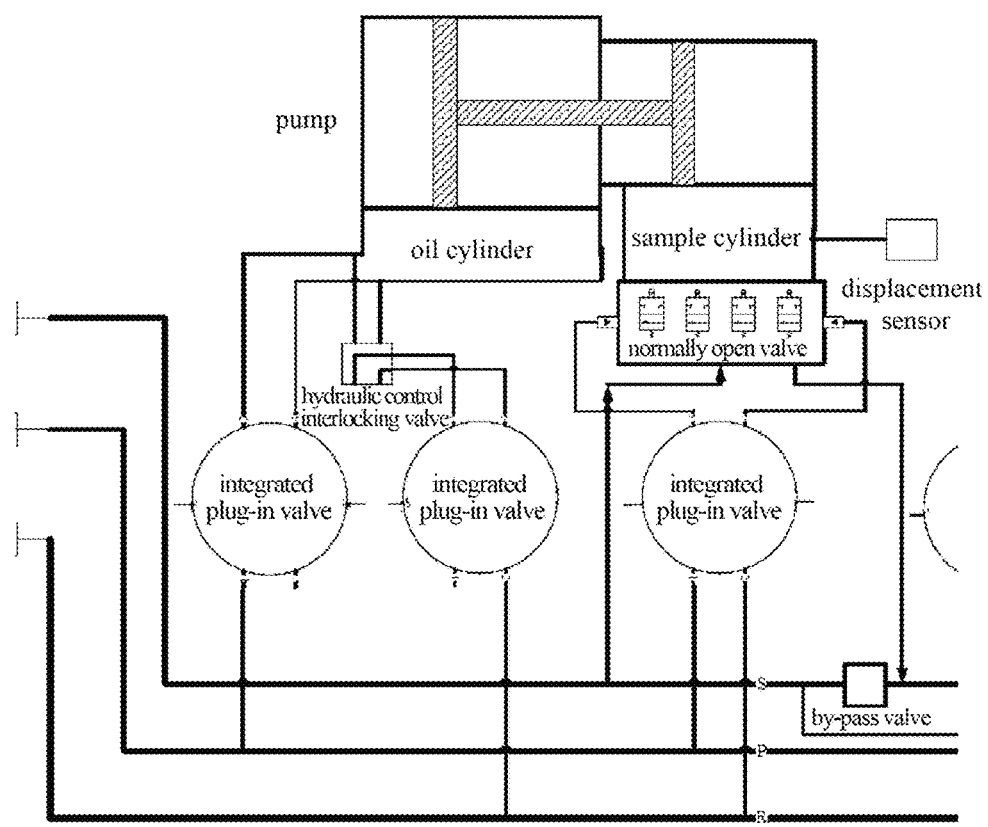
FIG. 1 is a diagram of the makeup of the existing high-pressure fluid mixing pump control system.
Figure 2:
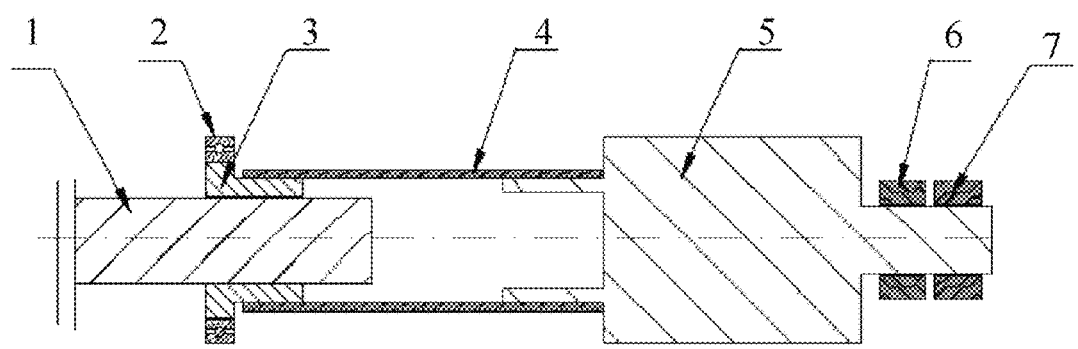
FIG. 2 is a diagram of the makeup of the high-pressure fluid mixing pump control system of an embodiment of the invention.

As shown in FIG. 2, the high-pressure fluid mixing pump control system of an embodiment of the invention mainly comprises: a transmission threaded rod 1, a bearing 2, a rotary nut 3, a connecting shaft 4, an accelerator 5, an electric brake 6 and a resolver sensor 7, wherein, the transmission threaded rod 1 is connected to a piston of a piston cylinder, and the linear motion of the piston is converted into a rotary motion via the transmission threaded rod 1, the bearing 2 and the rotary nut 3; the accelerator 5 increases the rotary speed to reduce transmission torque. The electric brake 6 is used for braking the piston to reach the purpose of controlling the motion of the piston; the resolver sensor 7 is used for metering the number of revolutions of the accelerator 5 and finally acquiring the suction amount of the mixing pump.

The specific operation of the high-pressure fluid mixing pump control system of an embodiment of the invention is as follows: when sucking formation fluid is needed, the piston performs a linear motion, converting the linear motion of the piston into a rotary motion via the threaded rod 1, the bearing 2 and the rotary nut 3 and controlling starting and stopping of the mixing pump via the accelerator 5 and the electric brake 6, utilizing the resolver sensor 7 to measure precisely the rotation angle, thus acquiring the displacement amount of the piston, and finally acquiring the precise suction amount, thus achieving the purpose of precisely controlling the fluid suction volume.

In summary, the high-pressure fluid mixing pump control system provided in an embodiment of the invention completely adopts the mode of mechanical control and is free of outside influence, thus is of high precision and has the advantages of a simplified structure, compactness, and great stability and reliability.

In addition, an embodiment of the invention also provides a fluid suction control method on the basis of aforesaid high-pressure fluid mixing pump control system. The method comprises mainly:

1) the resolver sensor metering the number of revolutions of the transmission threaded rod or the rotary element;

2) obtaining the linear displacement amount of the piston on the basis of the number of revolutions;

3) obtaining a suction amount of the mixing pump on the basis of the linear displacement amount of the piston.

The method may also comprise: controlling the rotate speed of the transmission threaded rod via the accelerator.

The method may also comprise: controlling starting and stopping of the mixing pump via the electric brake.

While the embodiments disclosed in the invention are as above, the foregoing contents merely are embodiments employed for easy to understanding the present invention, and are not intended to limit the present invention. Any person skilled in the art belongs to the invention can make any modification and change to the forms and details of the embodiments without departing from the spirit and scope disclosed in the present invention, but the patent protection scope of the present invention shall subject to the scope defined by the appended claims.

INDUSTRIAL APPLICABILITY

The high-pressure fluid mixing pump control system provided in an embodiment of the invention completely adopts the mechanical control to convert the linear motion of the piston into a rotary motion, and utilizes the resolver sensor to measure precisely a rotation angle, thus acquiring a piston displacement amount, and finally acquiring a suction volume, with very high precision and the advantages of a simplified structure, compactness, and great stability and reliability.

What is claimed is:

1. A high-pressure fluid mixing pump control system, comprising:
   a transmission threaded rod, and
   a resolver sensor,
   wherein one end of said transmission threaded rod is connected to an oil cylinder piston of a mixing pump, while the other end of said transmission threaded rod is connected to a connecting shaft via a bearing and a rotary nut, the connecting shaft is also connected to said resolver sensor via an accelerator that rotates coaxially with said transmission threaded rod, the accelerator increases the rotary speed to reduce transmission torque.

2. The system according to claim 1, also comprising:
   an electric brake being connected to said accelerator.

3. A fluid suction control method using the high-pressure fluid mixing pump control system according to claim 1, said method comprising:
   said resolver sensor metering the number of revolutions of said transmission threaded rod or said accelerator;
   obtaining a linear displacement amount of said piston on the basis of said number of revolutions;
   obtaining a suction amount of said mixing pump on the basis of the linear displacement amount of said piston.

4. The method according to claim 3, also comprising:
   controlling the rotate speed of said transmission threaded rod via said accelerator.

5. The method according to claim 3, also comprising:
   controlling starting and stopping of said mixing pump via an electric brake of said system.

6. The method according to claim 4, also comprising:
   controlling starting and stopping of said mixing pump via an electric brake of said system.

* * * * *